US012590808B2

(12) United States Patent (10) Patent No.: US 12,590,808 B2
Su et al. (45) Date of Patent: Mar. 31, 2026

(54) METHOD FOR RECOMMENDING PARKING, ELECTRONIC DEVICE, AND STORAGE MEDIUM

(71) Applicant: Fulian Precision Electronics (Tianjin) Co., LTD., Tianjin (CN)

(72) Inventors: Chien-Hao Su, Taoyuan (TW); Yu-Shan Lin, Taoyuan (TW); Yao-Wen Tung, New Taipei (TW); Kai-Siang You, Taoyuan (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 216 days.

(21) Appl. No.: 18/218,618

(22) Filed: Jul. 6, 2023

(65) Prior Publication Data

US 2024/0344837 A1 Oct. 17, 2024

(30) Foreign Application Priority Data

Apr. 17, 2023 (CN) .......................... 202310410629.2

(51) Int. Cl.
*G01C 21/34* (2006.01)
*G07B 15/02* (2011.01)
*G08G 1/14* (2006.01)

(52) U.S. Cl.
CPC ......... *G01C 21/3476* (2013.01); *G07B 15/02* (2013.01); *G08G 1/142* (2013.01); *G08G 1/145* (2013.01)

(58) Field of Classification Search
CPC .... G07B 15/02; G01C 21/3476; G08G 1/142; G08G 1/145; G08G 1/143; G08G 1/14; G06Q 30/0201; G06Q 30/0601
See application file for complete search history.

(56) References Cited

U.S. PATENT DOCUMENTS

| | | | | |
|---|---|---|---|---|
| 2012/0130872 A1* | 5/2012 | Baughman | ............ | G07F 17/246 |
| | | | | 340/932.2 |
| 2014/0320318 A1* | 10/2014 | Victor | .................... | G08G 1/146 |
| | | | | 340/932.2 |
| 2018/0218605 A1* | 8/2018 | Mowatt | .................. | G08G 1/144 |
| 2019/0088127 A1* | 3/2019 | Bostick | .................. | G08G 1/144 |
| 2019/0205798 A1* | 7/2019 | Rosas-Maxemin | .... | G08G 1/148 |
| 2020/0035101 A1* | 1/2020 | Brooks | .................. | G08G 1/143 |

* cited by examiner

*Primary Examiner* — Abby J Flynn
*Assistant Examiner* — Paulo Roberto Gonzalez Leite
(74) *Attorney, Agent, or Firm* — ScienBiziP, P.C.

(57) ABSTRACT

A method for recommending parking is provided. The method obtains vehicle information of a vehicle. Where the vehicle information is provided with a price and a license plate number. The method further determines whether a member of a mall corresponding to the vehicle has a consumption record of the mall according to the license plate member of the vehicle. The method further determines historical consumption areas according to the consumption record of the mall if yes, and determines a target parking space of the vehicle according to the historical consumption areas. The method further determines target shops of the mall according to the price of the vehicle if not, and determines the target parking space according to an area where the target shops of the mall are located. The method further recommends the target parking space to the vehicle. An electronic device and a non-transitory storage medium are also disclosed.

14 Claims, 9 Drawing Sheets

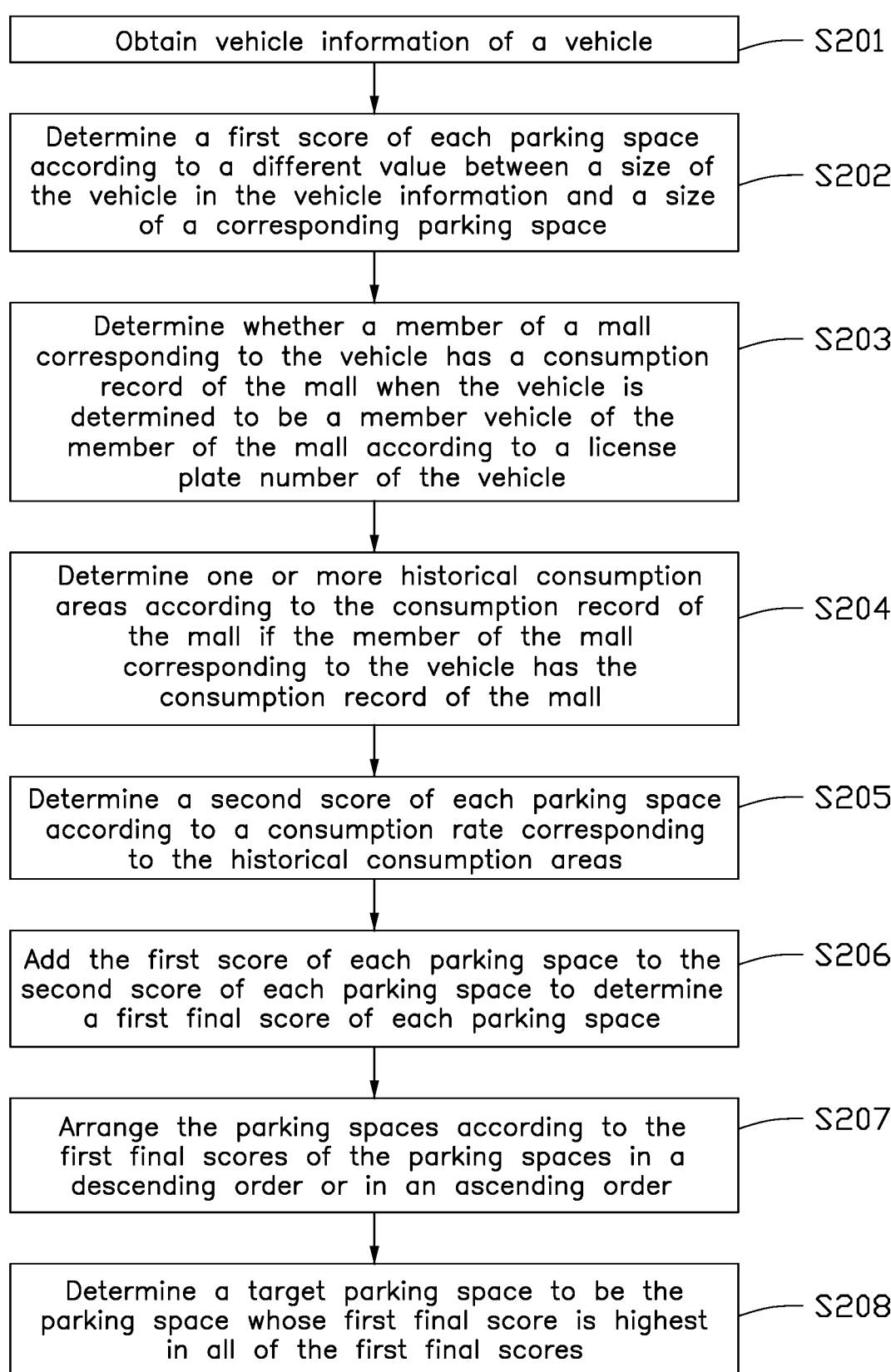

Obtain vehicle information of a vehicle — S201

Determine a first score of each parking space according to a different value between a size of the vehicle in the vehicle information and a size of a corresponding parking space — S202

Determine whether a member of a mall corresponding to the vehicle has a consumption record of the mall when the vehicle is determined to be a member vehicle of the member of the mall according to a license plate number of the vehicle — S203

Determine one or more historical consumption areas according to the consumption record of the mall if the member of the mall corresponding to the vehicle has the consumption record of the mall — S204

Determine a second score of each parking space according to a consumption rate corresponding to the historical consumption areas — S205

Add the first score of each parking space to the second score of each parking space to determine a first final score of each parking space — S206

Arrange the parking spaces according to the first final scores of the parking spaces in a descending order or in an ascending order — S207

Determine a target parking space to be the parking space whose first final score is highest in all of the first final scores — S208

FIG. 4

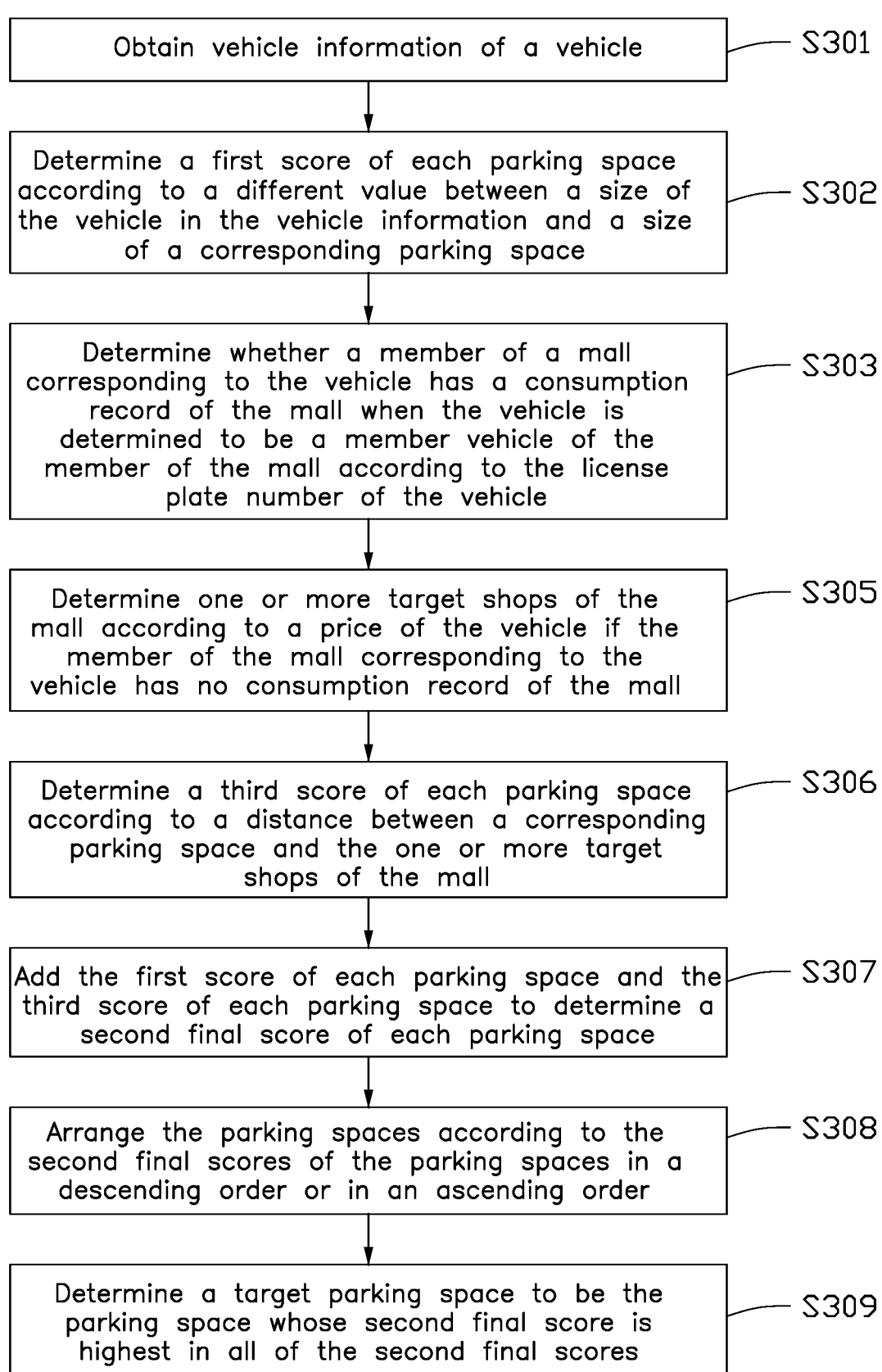

Obtain vehicle information of a vehicle —— S301

Determine a first score of each parking space according to a different value between a size of the vehicle in the vehicle information and a size of a corresponding parking space —— S302

Determine whether a member of a mall corresponding to the vehicle has a consumption record of the mall when the vehicle is determined to be a member vehicle of the member of the mall according to the license plate number of the vehicle —— S303

Determine one or more target shops of the mall according to a price of the vehicle if the member of the mall corresponding to the vehicle has no consumption record of the mall —— S305

Determine a third score of each parking space according to a distance between a corresponding parking space and the one or more target shops of the mall —— S306

Add the first score of each parking space and the third score of each parking space to determine a second final score of each parking space —— S307

Arrange the parking spaces according to the second final scores of the parking spaces in a descending order or in an ascending order —— S308

Determine a target parking space to be the parking space whose second final score is highest in all of the second final scores —— S309

FIG. 5

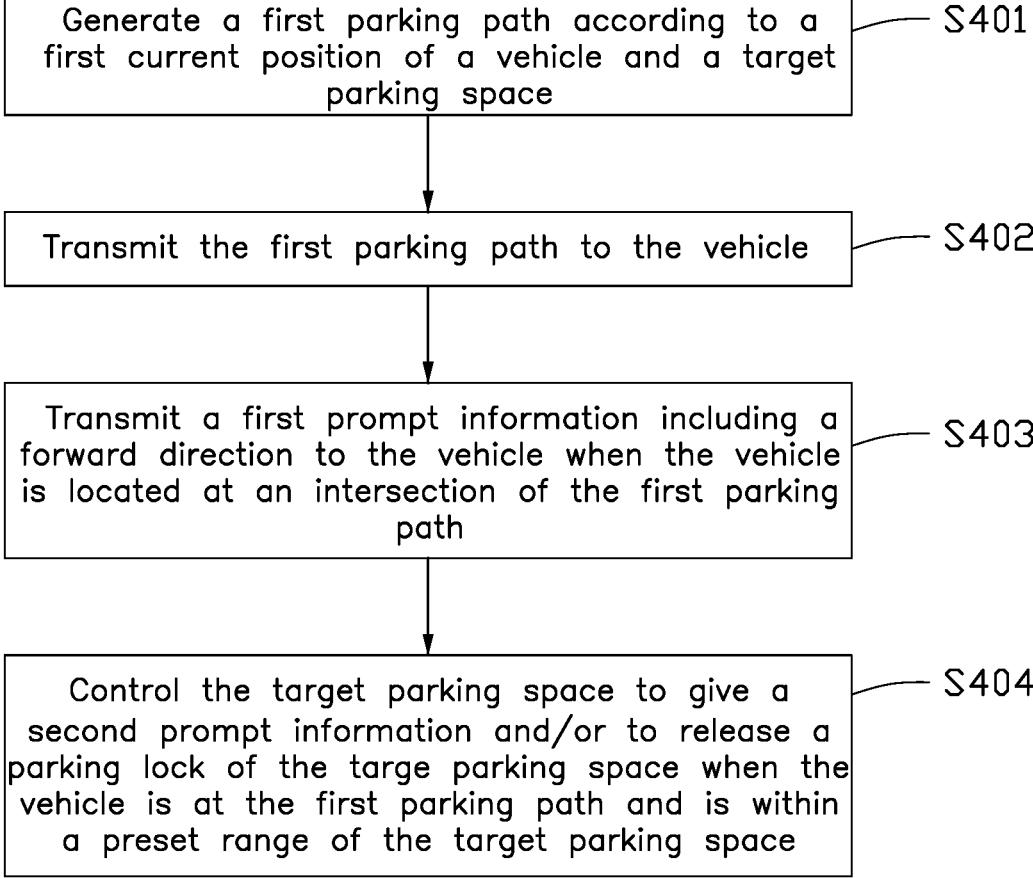

Generate a first parking path according to a first current position of a vehicle and a target parking space ——— S401

Transmit the first parking path to the vehicle ——— S402

Transmit a first prompt information including a forward direction to the vehicle when the vehicle is located at an intersection of the first parking path ——— S403

Control the target parking space to give a second prompt information and/or to release a parking lock of the targe parking space when the vehicle is at the first parking path and is within a preset range of the target parking space ——— S404

FIG. 6

METHOD FOR RECOMMENDING PARKING, ELECTRONIC DEVICE, AND STORAGE MEDIUM

FIELD

The subject matter herein generally relates to a parking technology, and particularly to a method for recommending parking, an electronic device, and a storage medium.

BACKGROUND

Now, a parking lot of a mall can employ a number of guiding persons to guide one or more vehicles to park. However, during a parking of the vehicle, a problem of needing many labors may be existed. And, some problems, for example, a longer period of time to look for a parking space, and a lower efficiency of parking the vehicle, may be existed. Moreover, communication expressions of some guiding persons may be inaccurate, thus a member of the mall (namely a vehicle driver of the vehicle) cannot be accurately guided to park the vehicle.

SUMMARY

An embodiment of the present application provides a method for recommending parking, an electronic device, and a storage medium which can improve a parking efficiency and a parking accuracy of a member vehicle, thus a stickiness of a member can be improved.

In a first aspect, an embodiment of the present application provides a method for recommending parking. The method obtains vehicle information of a vehicle. Where the vehicle information of vehicle comprises a price of the vehicle and a license plate number of the vehicle. The method determines whether a member of a mall corresponding to the vehicle has a consumption record of the mall when the vehicle is determined to be a member vehicle of the member of the mall according to the license plate member of the vehicle. The method further determines one or more historical consumption areas according to the consumption record of the mall if the member of the mall corresponding to the vehicle has the consumption record of the mall, and determines a target parking space of the vehicle from a plurality of parking spaces of the mall according to the one or more historical consumption areas. The method further determines one or more target shops of the mall according to the price of the vehicle if the member of the mall corresponding to the vehicle has no consumption record of the mall, and determines the target parking space of the vehicle according to an area where the one or more target shops of the mall are located. The method further recommends the target parking space to the vehicle.

The method obtains the vehicle information of the vehicle. Where the vehicle information of vehicle includes the price of the vehicle and the license plate number of the vehicle. The method further determines whether a member of a mall corresponding to the vehicle has a consumption record of the mall when the vehicle is determined to be a member vehicle of the member of the mall according to the license plate member of the vehicle and the member information. The method can conclude a consumption area where the member of the mall corresponding to the vehicle may come according to the historical consumption areas, and recommend the target parking space according to the consumption area where the member of the mall corresponding to the vehicle may come, thus the parking efficiency and an experience of the member of the mall who has consumed at the mall are improved. Or, the method can conclude one or more shops where the member of the mall corresponding to the vehicle may come according to the price of the vehicle, and recommend the target parking space according to the area of the one or more shops where the member of the mall corresponding to the vehicle may come or according to the area of the one or more shops where the member of the mall corresponding to the vehicle may come and the size of the target parking space, thus the parking efficiency and the experience of the member of the mall who does not consume at the mall are improved.

According to some embodiments of the present application, the method further determines a first score of each of the parking spaces according to a different value between a size of the vehicle in the vehicle information and a size of a corresponding parking space; where a correlation between the different value and the first score is a negative correlation.

According to some embodiments of the present application, the method further determines a second score of each of the parking spaces according to one or more consumption rates corresponding to the one or more historical consumption areas. Where a correlation between the one or more consumption rates and the second score is a positive correlation. The method further adds the first score of each of the parking spaces to the second score of each of the parking spaces to determine a plurality of first final scores of the parking spaces; each of the parking spaces corresponding to one of the first final scores. The method further determines the target parking space according to the first final scores. Where the target parking space is one of the parking spaces of the mall whose first final score is highest in all of the first final scores.

According to some embodiments of the present application, the method further determines a third score of each of the parking spaces according to a distance between a corresponding parking space and the one or more target shops of the mall. Where a correlation between the distance and the third score is a positive correlation. The method further adds the first score of each of the parking spaces to the third score of each of the parking spaces to determine a plurality of second final scores of the parking spaces. Each of the parking spaces corresponds to one of the second final scores. The method further determines the target parking space according to the second final scores, where the target parking space is one of the parking spaces of the mall whose second final score is highest in all of the second final scores.

According to some embodiments of the present application, the method further generates a first parking path according to a first current position of the vehicle and the target parking space. The method further transmits the first parking path to the vehicle.

According to some embodiments of the present application, the method further transmits a first prompt information comprising a forward direction to the vehicle when the vehicle is located at an intersection of the first parking path. The method further controls the target parking space to give a second prompt information and/or to release a parking lock of the target parking space when the vehicle is at the first parking path and is within a preset range of the target parking space. The method further transmits a third prompt information to the vehicle when the vehicle is not at any position of the first parking path. The method further generates a second parking path according to a second current position of the vehicle and the target parking space, and transmitting the second parking path to the vehicle.

According to some embodiments of the present application, the method further recommends one of the parking spaces corresponding to a preset permission of the vehicle to the vehicle when the vehicle is determined to comprise the preset permission according to the license plate number of the vehicle. The method further recommends a private parking space of the parking spaces to the vehicle when the vehicle is determined to comprise the private parking space according to the license plate number of the vehicle. The method further recommends a preset parking space of the parking spaces to the vehicle when the vehicle is determined to preset one of the parking spaces according to the license plate number of the vehicle.

In a second aspect, an embodiment of the present application provides an electronic device. The electronic device includes a storage device and at least one processor. The storage device stores one or more programs, which when executed by the at least one processor, cause the at least one processor to obtain vehicle information of a vehicle; where the vehicle information of the vehicle is provided with a price of the vehicle and a license plate number of the vehicle. The electronic device further causes the at least one processor to determine whether a member of a mall corresponding to the vehicle has a consumption record of the mall when the vehicle is determined to be a member vehicle of the member of the mall according to the license plate member of the vehicle. The electronic device further causes the at least one processor to determine one or more historical consumption areas according to the consumption record of the mall if the member of the mall corresponding to the vehicle has the consumption record of the mall, and determine a target parking space of the vehicle from a plurality of parking spaces of the mall according to the one or more historical consumption areas. The electronic device further causes the at least one processor to determine one or more target shops of the mall according to the price of the vehicle if the member of the mall corresponding to the vehicle has no consumption record of the mall, and determine the target parking space of the vehicle according to an area where the one or more target shops of the mall are located. The electronic device further causes the at least one processor to recommend the target parking space to the vehicle.

In a third aspect, an embodiment of the present application provides a non-transitory storage medium. The non-transitory storage medium stores a set of commands, when the commands being executed by at least one processor of an electronic device, causing the at least one processor to obtain vehicle information of a vehicle; where the vehicle information of the vehicle is provided with a price of the vehicle and a license plate number of the vehicle. The non-transitory storage medium further causes the at least one processor to determine whether a member of a mall corresponding to the vehicle has a consumption record of the mall when the vehicle is determined to be a member vehicle of the member of the mall according to the license plate member of the vehicle. The non-transitory storage medium further causes the at least one processor to determine one or more historical consumption areas according to the consumption record of the mall if the member of the mall corresponding to the vehicle has the consumption record of the mall, and determine a target parking space of the vehicle from a plurality of parking spaces of the mall according to the one or more historical consumption areas. The non-transitory storage medium further causes the at least one processor to determine one or more target shops of the mall according to the price of the vehicle if the member of the mall corresponding to the vehicle has no consumption record of the mall, and determine the target parking space of the vehicle according to an area where the one or more target shops of the mall are located. The non-transitory storage medium further causes the at least one processor to recommend the target parking space to the vehicle.

Details of the second aspect, the third aspect, and their implementation embodiments can refer to the description of the first aspect and the implementation embodiments of the first aspect, and details are not described herein again. Advantages of the second aspect, the third aspect, and their implementation embodiments can refer to advantages of the first aspect and the implementation embodiments of the first aspect, and details are not described herein again.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIG. 4 is a flowchart of a second embodiment of a method for recommending parking.

FIG. 5 is a flowchart of a third embodiment of a method for recommending parking.

FIG. 6 is a flowchart of an embodiment of a method after recommending parking space to a vehicle.

DETAILED DESCRIPTION

Figure 1:
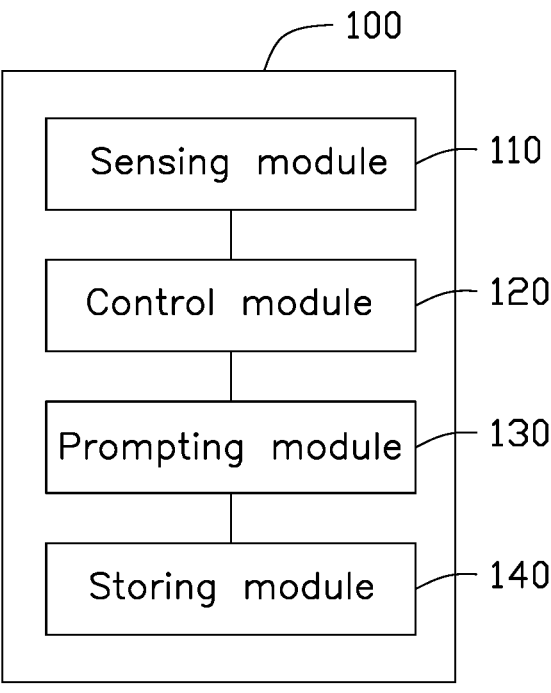
FIG. 1 is a schematic structural view of an embodiment of a system for recommending parking.

"A plurality of" in this application means two or more. In the descriptions of this application, terms such as "first" and "second" are merely used for distinction and description, and should not be understood as an indication or implication of relative importance or an indication or implication of an order.

In addition, the term "for example" in the embodiments of this application is used to represent giving an example, an illustration, or a description. Any embodiment or implementation solution described as an "example" in this application should not be explained as being more preferred or having more advantages than another embodiment or implementation solution. Exactly, the term "example" is used to present a concept in a specific manner.

A brief description of related technologies is as follows.

Now, an efficiency for guiding a parking of a vehicle into a parking space of a parking lot of a mall by an existing method for recommending parking is lower. For example, the parking lot of the mall can employ a number of guiding persons to guide one or more vehicles to park. However, during the parking of the vehicle, a problem of needing many labors may exist. And, some problems, for example, a longer period of time to look for the parking space, and a lower efficiency of parking the vehicle, may exist. Moreover, communication expressions of some guiding persons may be inaccurate, thus a member of the mall (namely a vehicle driver of the vehicle) cannot be accurately guided to park the vehicle. And for example, the parking lot of the mall can install a system for recommending parking, and the one or more vehicles can be guided to park via the system for recommending parking. However, at a guiding of the system for recommending parking, the vehicle driver still need to look for the parking space by himself/herself. Sometimes, one or more guiding persons are needed to assist the vehicle driver to park. Thus, some problems, for example, a needing of labors, the longer period of time to look for the parking space, the lower efficiency of parking the vehicle, and an inaccuracy parking by the member of the mall (namely the vehicle driver of the vehicle), may be existed. Simultaneously, when there are many to-be-parked vehicles in the parking lot, a congestion in the parking lot may be caused. And, the existing system for recommending parking cannot efficiently use related data, thus the parking space where the vehicle parks may be not suitable for the member of the mall (namely the vehicle driver of the vehicle). Thus, a stickiness of the member of the mall is lower.

And, sizes of the parking spaces of the parking lot are unified and standardized. Thus, there may be not suitable parking space for a recreational vehicle or a specific electric car. Moreover, due to a lacking of an accurate guiding of the parking, a distance between two adjacent vehicles in the parking lot cannot be ensured to be within a safety distance.

Thus, a method for recommending parking, an electronic device, and a computer readable storage medium capable of improving a parking efficiency of the vehicle of the member of the mall and a parking accuracy of the vehicle of the member of the mall, thus the stickiness of the member of the mall can be improved.

Referring to FIG. 1, FIG. 1 is a schematic structural view of an embodiment of a system for recommending parking. The system for recommending parking 100 includes a sensing module 110, a control module 120, a prompting module 130, and a storing module 140. The sensing module 110 is configured to obtain vehicle information of the vehicle. The sensing module 110 includes an image capturing device such as a camera, an ultrasonic parking space probe, an infrared sensor, a temperature sensor, and so on. The storing module 140 is configured to store related information of the parking lot and related information of the mall corresponding to the parking lot. The related information of the parking lot includes a size of each parking space of the parking lot. The related information of the mall corresponding to the parking lot includes member information of the mall. The member information includes a license plate number of each member. The member information can further include a consumption record of the mall. It can be understood that, when the member of the mall does not consume at the mall, the member information does not include the consumption record of the mall. The storing module 140 includes a storage device. The prompting module 130 is configured to give prompt information to the member of the mall (namely the vehicle driver of the vehicle). The prompting module 130 includes a display screen, an indicating lamp, and so on. The control module 120 is configured to execute the method for recommending parking of the embodiment. The control module 120 includes a processor.

Figure 2:
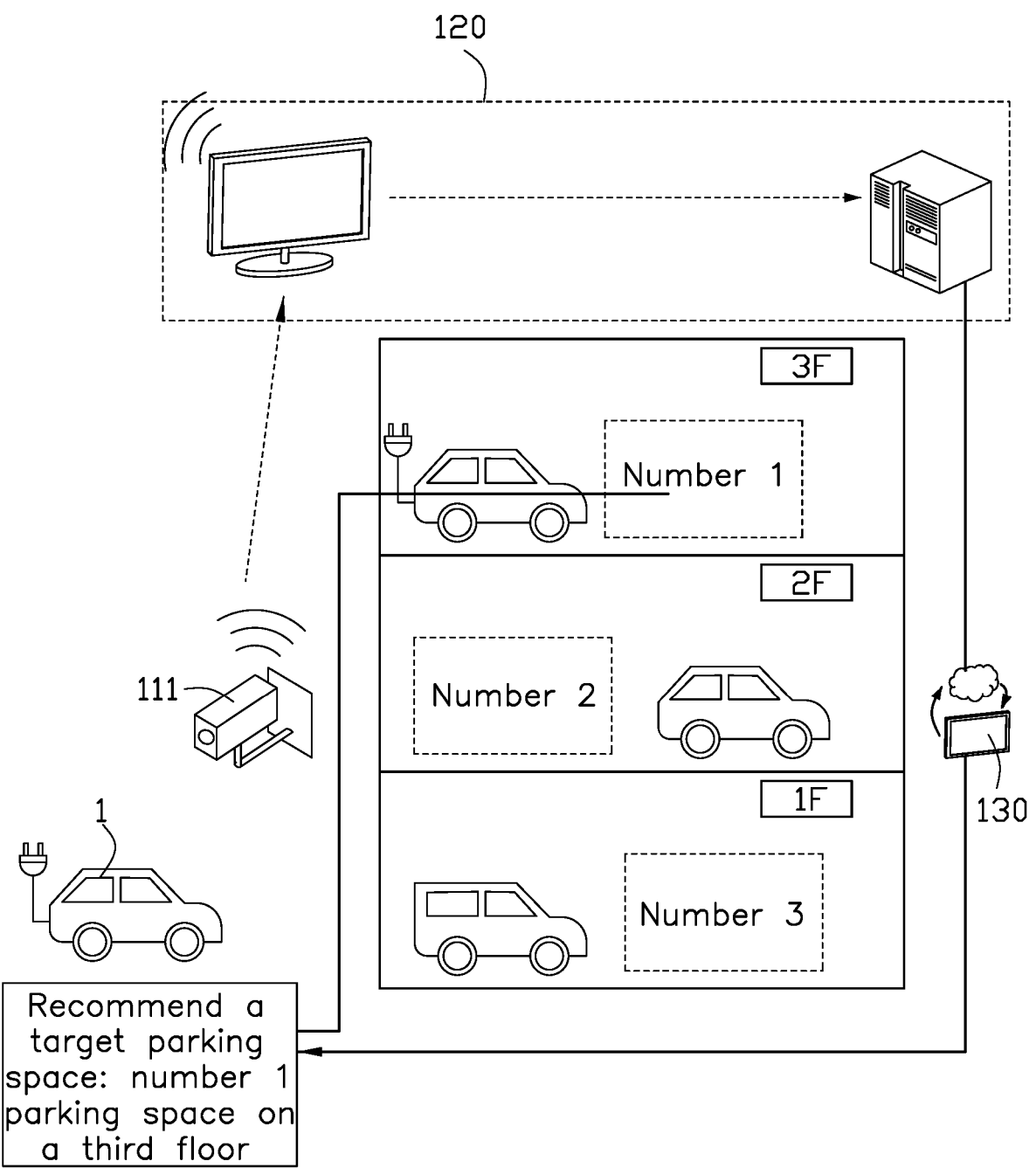
FIG. 2 is a scenario view of an embodiment of a method for recommending parking.

Referring also to FIG. 2, FIG. 2 is a scenario view of an embodiment of a method for recommending parking. A member drives a vehicle 1 to arrive at an entrance of the parking lot of the mall. The camera 111 identifies the vehicle 1. The control module 120 can obtain the vehicle information of the vehicle 1 according to an identification of the camera 111 and execute the method for recommending parking of the embodiment. The control module 120 can further control the prompting module 130 to give the prompt information to the vehicle 1. Thus, a parking space which is on the third floor of the mall and suitable for a size of the vehicle of the member can be provided to the member which has the consumption record of the mall, for example the parking space which is a number 1 parking space on the third floor of the mall as shown in FIG. 2 can be provided to the member which has the consumption record of the mall.

It can be understood that, the scenario of the system for recommending parking shown in FIG. 2 can be, the member drives the vehicle 1 to arrive at the entrance of the parking lot of the mall. The camera 111 can identify the vehicle 1. The control module 120 can obtain the vehicle information of the vehicle 1 according to an identification of the camera 111 and execute the method for recommending parking of the embodiment. The control module 120 can further control the prompting module 130 to give the prompting information to the vehicle, thus a parking space which is at the third floor of the mall and suitable for a size of the vehicle of the member can be provided to the member of the mall which does not have the consumption record, for example the parking space which is a number 1 parking space at the third floor of the mall as shown in FIG. 2 can be provided to the member of the mall which does not have the consumption record of the mall.

Figure 3:
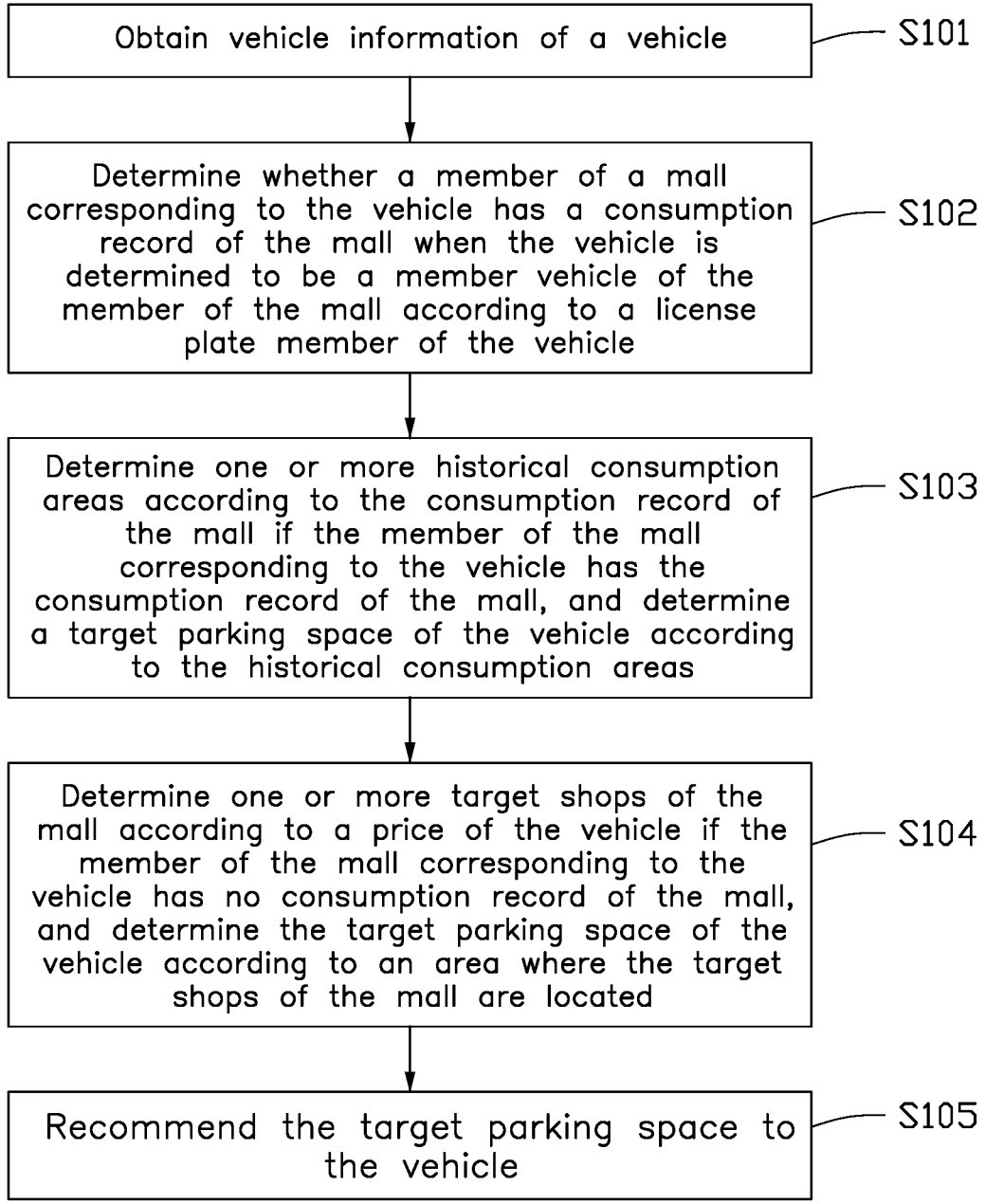
FIG. 3 is a flowchart of a first embodiment of a method for recommending parking.

Referring also to FIG. 3, a method for recommending parking is shown. The method for recommending parking includes:

S101: obtaining vehicle information of a vehicle.

A system for recommending parking 100 can be installed at the parking lot of the mall. In detail, the sensing module 110 can be installed at the entrance of the parking lot. When the vehicle 1 arrives at the entrance of the parking lot, the sensing module 110 can obtain the vehicle information of the vehicle. The vehicle information includes a price of the vehicle, a size of the vehicle, and the license plate number of the vehicle.

In some embodiments, the camera 111 and the ultrasonic parking space probe are installed at the entrance of the parking lot. When the vehicle 1 arrives at the entrance of the parking lot, the ultrasonic parking space probe can detect the vehicle. After the ultrasonic parking space probe detects the vehicle 1, the ultrasonic parking space transmits a signal to the camera 111. The camera 111 captures an image of the vehicle 1 according to the signal. The control module 120 obtains the image captured by the camera 111, and identifies and processes the image to obtain the vehicle information of the vehicle 1. The vehicle information of the vehicle 1 includes the price of the vehicle 1, the size of the vehicle 1, and the license plate number of the vehicle 1.

S102: determining whether the member of the mall corresponding to the vehicle has the consumption record of the mall when the vehicle is determined to be a member vehicle of the member of the mall according to the license plate member of the vehicle.

After obtaining the license plate number of the vehicle 1, the method acquires the member information of the mall, to search for the license plate number of a member in the member information of the mall. When the license plate number of the vehicle 1 is the same as the license plate number of a member in the member information of the mall, the method can determine that the vehicle 1 is the member vehicle of the member of the mall, namely determine that the vehicle 1 is a vehicle driven by the member of the mall. When the license plate number of the vehicle 1 is not the same as the license plate number of any member in the member information of the mall, the method can determine that the vehicle 1 is not the member vehicle of the member of the mall. Where, a manager of the mall can set one or more member conditions, and a user can be determined to be the member of the mall when the user meets the member conditions.

The consumption record of the mall includes a consumption number and/or a consumption amount. Although the vehicle 1 is the member vehicle of the member of the mall, the member of the mall may have no consumption at the mall. Thus, two states that the member driving the vehicle 1 has consumed at the mall and the member driving the vehicle 1 does not consume at the mall can be existed. Thus, after the vehicle 1 is determined to be the member vehicle of the member of the mall, the method can search for the consumption record of member driving the vehicle 1 according to the member information of the mall, to determine whether the member driving the vehicle 1 has the consumption record of the mall. If the member driving the vehicle 1 has the consumption record of the mall, the method can determine that the member driving the vehicle 1 has consumed at the mall. If the member driving the vehicle 1 has no consumption record of the mall, the method can determine that the member driving the vehicle 1 does not consume at the mall.

S103: determining one or more historical consumption areas according to the consumption record of the mall if the member of the mall corresponding to the vehicle has the consumption record of the mall, and determining a target parking space of the vehicle according to the historical consumption areas.

The historical consumption areas are the areas of the mall where the member of the mall corresponding to the vehicle has consumed, for example, one or more floors of the mall where the member of the mall corresponding to the vehicle has consumed. It can be understood that, in the mall, each floor includes one or more parking spaces in this scenario, the historical consumption areas can be one or more floors of the mall where the member of the mall corresponding to the vehicle has consumed.

When the member of the mall corresponding to the vehicle 1 has the consumption record of the mall, the method can determine the historical consumption areas according to the consumption record of the mall. For example, the consumption record of the mall shows that the member of the mall corresponding to the vehicle 1 has consumed at a tenth floor of the mall, the method can determine that the historical consumption areas of the vehicle 1 is at the tenth floor of the mall, thus the method can determine that the target parking space of the vehicle 1 is the parking space at the tenth floor.

In some embodiments, to park the vehicles 1 with different sizes to different parking spaces which each is suitable for a vehicle with a corresponding size, the sizes of the parking spaces in the parking lot can be different. Thus, after obtaining the size of the vehicle, the method can acquire the sizes of all of the parking spaces in the parking lot, and determine the size of the parking space required by the vehicle 1 according to the size of the vehicle 1, to find the parking space whose size is suitable for the vehicle 1. For example, the sizes of the parking spaces in the parking lot can include a large size, a medium size, and a small size. When the vehicle 1 is a compact vehicle, the method can determine that the size of the target parking space is the small size.

Thus, the method can further determine the target parking space in all usable parking spaces of the parking lot according to the size of the target parking space and the historical consumption areas.

In an example, the method can acquire that the size of the target parking space is the small size according to the size of the vehicle, and determine that the member of the mall corresponding to the vehicle has consumed at the tenth floor according to the consumption record of the mall. Thus, the method can determine that the target parking space is the parking space with the small size at the tenth floor, and recommend the parking space with the small size at the tenth floor to the vehicle 1 driven by the member of the mall.

It can be understood that, when the member of the mall corresponding to the vehicle having the consumption record of the mall is determined according to the member information of the mall, the method can conclude a consumption area where the member of the mall corresponding to the vehicle may come according to the historical consumption areas, and recommend the target parking space according to the consumption area where the member of the mall corresponding to the vehicle may come or according to the consumption area where the member of the mall corresponding to the vehicle may come and the size of the target parking space, thus the parking efficiency and an experience of the member of the mall who has consumed at the mall are improved.

S104: determining one or more target shops of the mall according to the price of the vehicle if the member of the mall corresponding to the vehicle has no consumption record of the mall, and determining the target parking space of the vehicle according to an area where the target shops of the mall are located.

The vehicles 1 with different brands have different prices. For example, the price of the vehicle 1 which is a premium brand vehicle is higher than the price of the vehicle 1 which is a budget brand vehicle. And, the shops of the mall have different classes, and each class can be determined according to an average price of the consumption in the shop. For example, the mall has one or more shops whose average price of the consumption is lower and one or more shops whose average price of the consumption is higher. The one or more shops whose average prices of the consumption are lower includes, for example, one or more affordable shops, one or more food courts, and so on. The one or more shops whose average prices of the consumption are higher includes, for example, one or more specialty boutiques, one or more expensive restaurants, and so on.

Thus, after obtaining the price of the vehicle, the method can determine one or more shops where the member of the mall corresponding to the vehicle may come according to the price of the vehicle. For example, when the vehicle is the premium brand vehicle, the method can determine that the member of the mall corresponding to the vehicle may come to one or more shops each having a higher average price of the consumption, and determine that the target shops of the mall can be the one or more shops each with the higher average price of the consumption. Thus, the method can determine the one or more target shops where the member of the mall corresponding to the vehicle may come according to the price of the vehicle. When the vehicle is the budget brand vehicle, the method can determine that the member of the mall corresponding to the vehicle may come to one or more shops each having a lower average price of the consumption, and determine that the target shops of the mall can be the one or more shops each with the lower average price of the consumption. An area where the target shops are can be the floor of the mall, for example the area is the tenth floor of the mall.

In some embodiments, the method can further determine the target parking space in all usable parking spaces of the parking lot according to the size of the target parking space and the area where the target shops are located.

After the one or more target shops are determined according to the price of the vehicle, the method can determine the target parking space according to the area where the one or more target shops are located or according to the area where the one or more target shops are located and the size of the target parking space.

In an example, the method can acquire that the size of the target parking space is the small size according to the size of the vehicle and acquire that the vehicle is the premium brand vehicle. The method can determine that the one or more target shops are specialty boutiques according to the premium brand vehicle, and determine that the specialty boutiques are at tenth floor. Thus, the method can determine that the target parking space is the parking space with the small size at the tenth floor, and recommend the parking space with the small size at the tenth floor to the vehicle 1 driven by the member of the mall.

It can be understood that, when the member of the mall corresponding to the vehicle having no consumption record of the mall is determined according to the member information of the mall, the method can conclude one or more shops where the member of the mall corresponding to the vehicle may come according to the price of the vehicle, and recommend the target parking space according to the area of the one or more shops where the member of the mall corresponding to the vehicle may come or according to the area of the one or more shops where the member of the mall corresponding to the vehicle may come and the size of the target parking space, thus the parking efficiency and the experience of the member of the mall who does not consume at the mall are improved.

S105: recommending the target parking space to the vehicle.

The method can determine the target parking space in all usable parking spaces of the parking lot according to the size of the target parking space and the historical consumption areas or according to the area where the one or more target shops are located and the size of the target parking space. The method can further recommend the target parking space to the vehicle 1. There are many manners to recommend the target parking space to the vehicle 1. For example, the method can transmit position information of the target parking space to the vehicle 1, and after the vehicle 1 receives the position information of the target parking space, the vehicle 1 can display the position information of the target parking space on a display device of the vehicle 1.

It can be understood that, the method can recommend a suitable level of the floor of the mall where the target parking space is located and a detail parking space to the member of the mall corresponding to the vehicle 1 according to the vehicle information of the vehicle and the member information of the mall. Thus, the member of the mall corresponding to the vehicle 1 can park the vehicle 1 into the parking space at a certain floor of the mall where the member of the mall corresponding to the vehicle 1 frequently visit more quickly, and a private service can be provided to the member of the mall corresponding to the vehicle 1. Therefore, a stickiness of the member is provided. It can be understood that, the method starts to obtain the vehicle information of the vehicle 1 at the entrance of the parking lot, and determines the target parking space suitable for the member of the mall corresponding to the vehicle 1 according to the vehicle information and the member information. The method can further transmit the target parking space to the vehicle 1 immediately. Thus, the method can guide the member of the mall to drive the vehicle 1 to the target parking space.

As shown in FIG. 2, the vehicle driver drives the vehicle 1 to arrive at the entrance of the parking lot of the mall. The camera 111 can identify the vehicle 1. The control module 120 can obtain the vehicle information of the vehicle 1 according to an identification of the camera 111. The vehicle information can include the size of the vehicle, the license plate number of the vehicle, and the price of the vehicle. Firstly, the method acquires the sizes of all of the parking spaces usable in the parking lot. Then, when the vehicle driver is determined to be the member of the mall according to the license plate number of the vehicle and the member information of the mall, the method further determine whether the member of the mall corresponding to the vehicle has the consumption record of the mall. When the member of the mall corresponding to the vehicle has the consumption record of the mall, the method can determine that the historical consumption areas are at the third floor according to the consumption record of the mall. The method further determines that the size of the target parking space is the small size according to the vehicle with the small size. The method can further determine that the target parking space is the parking space with the small size at the third floor according to the target parking space with the small size and the historical consumption areas being at the third floor, for example the target parking space is the number 1 parking space at the third floor of the mall. Thus, the method displays the position information of the number 1 parking space at the third floor of the mall on the display device, to recommend the number 1 parking space with the small size at the third floor of the mall to the member driving the vehicle 1.

The scenario shown in FIG. 2 can further be, for example, when the member of the mall corresponding to the vehicle 1 has no consumption record of the mall, the method can determine that the one or more target shops are specialty boutiques according to the premium brand vehicle, and determine that the specialty boutiques are at the third floor. The method further determines that the size of the target parking space is the small size according to the vehicle with the small size. The method can further determine that the target parking space is the parking space with the small size at the third floor according to the target parking space with the small size and the area of the specialty boutiques being at the third floor, for example the target parking space is the number 1 parking space at the third floor of the mall. Thus, the method displays the position information of the number 1 parking space at the third floor of the mall on the display device, to recommend the number 1 parking space with the small size at the third floor of the mall to the member driving the vehicle 1.

In some embodiments, referring to FIG. 4, the method further includes:

S201: obtaining vehicle information of a vehicle.

The S201 in FIG. 4 is the same as the S101 in FIG. 3, the detail can refer to the related description of the S101 in FIG. 3, which will not be described herein.

S202: determining a first score of each parking space according to a different value between a size of the vehicle in the vehicle information and a size of a corresponding parking space.

The size of the vehicle is a footprint area of the vehicle. The size of each parking space is an area of the parking space. After obtaining the size of the vehicle, the method acquires sizes of the parking spaces usable in the parking lot, subtracting the size of the vehicle from the size of each parking space to determine the different value between the size of the vehicle and the size of each parking space, and determines the first score of each parking space according to a corresponding different value.

A formula to determine the first score of each parking space is as follows:

$$S_x = \left[1 - \frac{|s - s_x|}{\max\{s_1 \sim s_n\}}\right] \times 100$$

Where, $S_x$ is the first score of a xth parking space, S is the size of the vehicle, $S_1 \sim S_n$ is the sizes of the parking spaces in the parking lot, for example, $S_1$ is the size of a first parking space, $S_2$ is the size of a second parking space, $S_n$ is the size of a nth parking space, max $\{s_1 \sim s_n\}$ is the size of a parking space which is largest in the parking lot. The formula shows that, the less the different value between the size of the vehicle and the size of the parking space, the higher is the first score of the parking space. Namely, a correlation between the different value and the first score is a negative correlation.

It can be understood that, the first score of each parking space is determined according to the different between the size of the vehicle and the size of each parking space, and the correlation between the different value and the first score is the negative correlation, thus a waste of the space of the parking spaces can be avoided.

S203: determining whether the member of the mall corresponding to the vehicle has the consumption record of the mall when the vehicle is determined to be a member vehicle of the member of the mall according to the license plate number of the vehicle.

The S203 in FIG. 4 is the same as the S102 in FIG. 3, the detail can refer to the related description of the S102 in FIG. 3, which will not be described herein.

S204: determining one or more historical consumption areas according to the consumption record of the mall if the member of the mall corresponding to the vehicle has the consumption record of the mall.

The S204 in FIG. 4 is a part of the S103 in FIG. 3, the detail can refer to the related description of the S103 in FIG. 3, which will not be described herein.

S205: determining a second score of each parking space according to one or more consumption rates corresponding to the historical consumption areas.

The member corresponding to the vehicle may consume at many floors of the mall, however a consumption number and/or a consumption amount in different floors may be different. Thus, the consumption rates at the floors of the mall recorded in the consumption record of the mall may be different. For example, the member corresponding to the vehicle consumes 200 yuan at the second floor of the mall, and consumes 300 yuan at the third floor of the mall, thus the consumption rate of the member corresponding to the vehicle at the second floor is 40%, and the consumption rate of the member corresponding to the vehicle at the third floor is 60%.

Thus, the method can determine the second score of each parking space according to the consumption rates corresponding to the historical consumption areas.

A formula to determine the second score of each parking space is as follows:

$$F_x = L \times 100$$

Where, $F_x$ is the second score of the xth parking space, L is a corresponding consumption rate corresponding to the historical consumption area. The formula shows that, the higher the consumption rate, the higher is the second score of the parking space.

S206: adding the first score of each parking space to the second score of each parking space to determine a first final score of each parking space.

The method determines the first final score of each parking space according to the first score of each parking space and the second score of each parking space. The parking space whose first final score is a highest can be a recommended parking space. Where, a formula to determine the first final score of each parking space is as follows:

$$S_{corex} = S_x + F_x$$

Where, $S_{corex}$ is the first final score of the xth parking space, $S_x$ is the first score of the xth parking space, and $F_x$ is the second score of the xth parking space.

S207: arranging the parking spaces of the mall according to the first final scores of the parking spaces in a descending order or in an ascending order.

After determining the first final score of each parking space in the parking lot, the method can arrange all of the parking spaces in the parking lot according to the first final scores of the parking spaces in the descending order or in the ascending order. For example, the first final score of a parking space A is 80, the first final score of a parking space B is 70, and the first final score of a parking space C is 94, the method can arrange the parking spaces according to the first final scores in the descending order, thus the parking spaces are arranged as the parking space C, the parking space A, and the parking space B.

S208: determining a target parking space to be the parking space whose first final score is highest in all of the first final scores.

For example, continuing with the above example, the target parking space is the parking space C.

Referring also to FIG. 2, the method can determine that the brand of the vehicle 1 is a medium or large sized SUV-imported and station wagon. The method further determines the size of the vehicle according to the brand of the vehicle. The method can further acquire the sizes of all of the parking spaces usable in the parking lot according to the size of the vehicle, and determine the first score of each parking space according to the different value between the size of the vehicle and the size of a corresponding parking space. Then, the method determines the second score of each parking space according to the consumption rates corresponding to the historical consumption areas if the member of the mall corresponding to the vehicle has the consumption record of the mall. The method adds the first score of each parking space to the second score of each parking space to determine the first final score of each parking space. The method arranges the parking spaces in the parking lot according to the first final scores of the parking spaces in the descending order or in the ascending order. The method further determines that the parking space whose first final score is highest in all of the first final scores is a private parking space at the third floor for the medium or large sized SUV-imported and station wagon vehicle. Thus, the target parking space is the private parking space at the third floor for the medium or large sized SUV-imported and station wagon vehicle.

It can be understood that, the method obtains the vehicle information of the vehicle 1 at the entrance of the parking lot, acquires the sizes of the parking spaces according to the size of the vehicle, and determines the first score of each parking space according to the different value between the size of the vehicle and the size of a corresponding parking space. The method further determines whether the member of the mall corresponding to the vehicle has the consumption record of the mall when the vehicle is determined to be a member vehicle of the member of the mall according to the license plate number of the vehicle and the member information. The method further determines the historical consumption areas according to the consumption record of the mall if the member of the mall corresponding to the vehicle has the consumption record of the mall, and determines the second score of each parking space according to the consumption rates corresponding to the historical consumption areas. The method further adds the first score of each parking space to the second score of each parking space to determine the first final score of each parking space, and arranges the parking spaces according to the first final scores of the parking spaces in the descending order or in the ascending order. The method further determines the target parking space to be the parking space whose first final score is highest in all of the first final scores. Thus, an optimum parking space suitable for the member having the consumption record of the mall can be determined.

In some embodiments, referring to FIG. 5, the method for recommending parking can include:

S301: obtaining vehicle information of a vehicle.

The S301 in FIG. 5 is the same as the S201 in FIG. 4, the detail can refer to the related description of the S201 in FIG. 4, which will not be described herein.

S302: determining a first score of each parking space according to a different value between a size of the vehicle in the vehicle information and a size of a corresponding parking space.

The S302 in FIG. 5 is the same as the S202 in FIG. 4, the detail can refer to the related description of the S202 in FIG. 4, which will not be described herein.

S303: determining whether the member of the mall corresponding to the vehicle has the consumption record of the mall when the vehicle is determined to be a member vehicle of the member of the mall according to the license plate number of the vehicle.

The S303 in FIG. 5 is the same as the S203 in FIG. 4, the detail can refer to the related description of the S203 in FIG. 4, which will not be described herein.

S305: determining one or more target shops of the mall according to the price of the vehicle if the member of the mall corresponding to the vehicle has no consumption record of the mall.

The S305 in FIG. 5 is a part of the S104 in FIG. 3, the detail can refer to the related description of the S104 in FIG. 3, which will not be described herein.

S306: determining a third score of each parking space according to a distance between a corresponding parking space and the one or more target shops of the mall.

A formula to determine the third score of each parking space is as follows:

$$M_x = m \times \frac{\sum d_1}{d_{1,x}} + (100 - m) \times \frac{\sum d_2}{d_{2,x}}$$

Where, $M_y$ is the third score of a xth parking space, m is a coefficient corresponding to the price of the vehicle, a value range of the m is 1~100. In detail, when the price of the vehicle is higher, the value of the m is greater. For example, when the price of the vehicle is lowest, a corresponding value of the m is 1; when the price of the vehicle is highest, the corresponding value of the m is 100. $\Sigma d_1$ is a distance between all of the usable parking spaces in the parking lot and the area where one or more first shops are located. The one or more first shops are the shops whose average price of the consumption is greater than or equal to a first threshold. $d_{1,x}$ is a distance between the xth parking space and the area where the one or more first shops are located. $d_2$ is a distance between a certain parking space and one or more second shops. The one or more second shops are the shops whose average price of the consumption is less than the first threshold. $d_{2,x}$ is a distance between the xth parking space and the area where the one or more second shops are located. The formula shows that, the higher the price of the vehicle, the higher is the third score of the parking space which is nearest to the area where the one or more shops with a higher average price of the consumption are located. And, the lower the price of the vehicle, the higher is the third score of the parking space which is nearest to the area where the one or more shops with a lower average price of the consumption are located.

S307: adding the first score of each parking space and the third score of each parking space to determine a second final score of each parking space.

The method determines the second final score of each parking space according to the first score of each parking space and the third score of each parking space. The method further arranges all of the parking spaces according to the second final scores of the parking spaces, and determines a recommended parking space to be the parking space whose second final score is highest in all of the second final scores. Where, a formula to determine the second final score of each parking space is as follows:

$$S_{corex} = S_x + M_x$$

Where, $S_{corex}$ is the second final score of the xth parking space, $S_x$ is the first score of the xth parking space, and $M_x$ is the third score of the xth parking space.

S308: arranging the parking spaces of the mall according to the second final scores of the parking spaces in a descending order or in an ascending order.

The S308 in FIG. 5 is the same as the S207 in FIG. 4, the detail can refer to the related description of the S207 in FIG. 4, which will not be described herein.

S309: determining a target parking space to be the parking space whose second final score is highest in all of the second final scores.

The S309 in FIG. 5 is the same as the S208 in FIG. 4, the detail can refer to the related description of the S208 in FIG. 4, which will not be described herein.

Referring also to FIG. 2, the method can determine that the vehicle 1 is an affordable brand vehicle. The method can acquire the sizes of all of the parking spaces usable in the parking lot according to the size of the vehicle, and determine the first score of each parking space according to the different value between the size of the vehicle and the size of the corresponding parking space. Then the method determines that the one or more target shops are affordable shops according to the affordable brand vehicle if the member of the mall corresponding to the vehicle has no consumption record of the mall. An area where the affordable shops are located is on the third floor. The method determines the third score of each parking space according to the distance between the corresponding parking space and the area where the affordable shops are located. The method further adds the first score of each parking space to the third score of each parking space to determine the second final score of each parking space. The method arranges the parking spaces in the parking lot according to the second final scores of the parking spaces in the descending order or in the ascending order. The method further determines that the parking space whose second final score is highest in all of the second final scores is a parking space with the small size at the third floor. Thus, the target parking space is the parking space with the small size on the third floor.

It can be understood that, the method obtains the vehicle information of the vehicle 1 at the entrance of the parking lot, acquires the sizes of the parking spaces according to the size of the vehicle, and determines the first score of each parking space according to the different value between the size of the vehicle and the size of a corresponding parking space. The method further determines whether the member of the mall corresponding to the vehicle has the consumption record of the mall when the vehicle is determined to be the member vehicle of the member of the mall according to the license plate number of the vehicle and the member information. The method further determines the one or more target shops according to the price of the vehicle if the member of the mall corresponding to the vehicle has no consumption record of the mall, and determines the third score of each parking space according to the distance between the corresponding parking space and the one or more target shops of the mall. The method further adds the first score of each parking space to the third score of each parking space to determine the second final score of each parking space, and arranges the parking spaces in the sparking lot according to the second final scores of the parking spaces in the descending order or in the ascending order. The method further determines the target parking space to be the parking space whose second final score is highest in all of the second final scores. Thus, an optimum parking space suitable for the member having no consumption record of the mall can be determined.

In some embodiments, referring to FIG. 6, after recommending the target parking space to the vehicle, the method further includes:

S401: generating a first parking path according to a first current position of the vehicle and the target parking space.

A parking path is a path from a current position of the vehicle 1 to the target parking space. The vehicle information further includes the first current position of the vehicle 1. After the sensing module captures the first current position of the vehicle 1, the control module can obtain the first current position of the vehicle 1 captured by the sensing module, and generate the first parking path according to the first current position of the vehicle 1 and the target parking space.

S402: transmitting the first parking path to the vehicle.

After transmitting the first parking path to the vehicle 1, the display device of the vehicle 1 can display the first parking path.

In some embodiments, as shown in FIG. 6, after transmitting the first parking path to the vehicle, the method further includes:

S403: transmitting a first prompt information including a forward direction to the vehicle when the vehicle is located at an intersection of the first parking path.

When the vehicle 1 moves to the intersection of the first parking path according to the first parking path, the control module can transmit the first prompt information to the vehicle 1. The first prompt information includes the forward direction of the vehicle 1, for example a left-turn, a right-turn, or a going straight. In an example, when the vehicle 1 moves to the intersection of the first parking path according to the first parking path, the control module can transmit the first prompt information including the right-turn to the vehicle 1.

S404: controlling the target parking space to give a second prompt information and/or to release a parking lock of the target parking space when the vehicle is at the first parking path and is within a preset range of the target parking space.

The preset range can be set in advance. The second prompt information is configured to prompt that the vehicle 1 is within the preset range of the target parking space. Controlling the target parking space to give the second prompt information includes, controlling an indicating lamp of the target parking space to blink, and/or controlling a display screen of the target parking space to display the license plate number of the vehicle 1.

Figure 7:
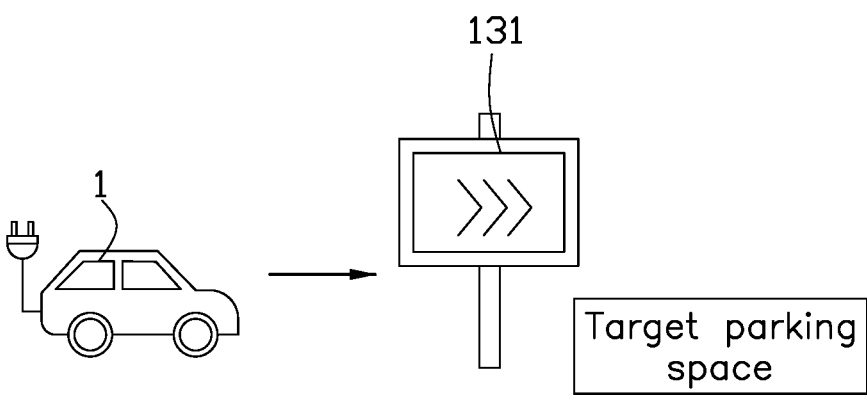
FIG. 7 is a scenario view of an embodiment showing how an indicating lamp works when a vehicle moves according to a first parking path in a method for recommending parking.

Referring to FIG. 7, in one embodiment, when the vehicle 1 moves to be within the preset range of the target parking space according to the first parking path, the control module can control the indicating lamp 131 of the target parking space to blink, and control the display screen of the target parking space to display the license plate number of the vehicle 1.

Figure 8:
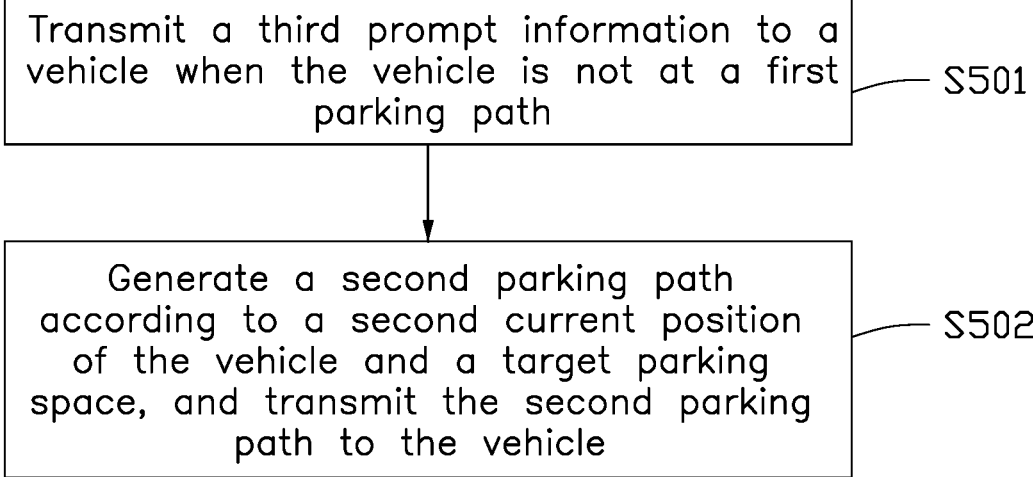
FIG. 8 is a flowchart of an embodiment of a method after transmitting a first parking path to a vehicle.

In some embodiments, referring to FIG. 8, after transmitting the first parking path to the vehicle, the method further includes:

S501: transmitting a third prompt information to the vehicle when the vehicle is not at any position of the first parking path.

The third prompt information is configured to prompt that the vehicle 1 is not at any position of the first parking path.

S502: generating a second parking path according to a second current position of the vehicle and the target parking space, and transmitting the second parking path to the vehicle.

Where, the second parking path is a regenerated parking path according to the second current position of the vehicle 1 and the target parking space.

In an example, when the vehicle 1 does not move according to the first parking path, the control module transmits the prompt information that the vehicle 1 is not located at any position of the first parking path, and regenerates a new parking path according to the second current position of the vehicle 1 and the target parking space. The control module further transmits the regenerated parking path to the vehicle 1.

It can be understood that, the method starts to acquire the vehicle information of the vehicle 1 at the entrance of the parking lot, determines the target parking space suitable for the member of the mall according to the vehicle information of the vehicle 1 and the member information of the mall, and transmits the target parking space to the vehicle 1 immediately, thus the member of the mall can be guided to drive the vehicle 1 to the target parking space of the mall.

Figure 9:
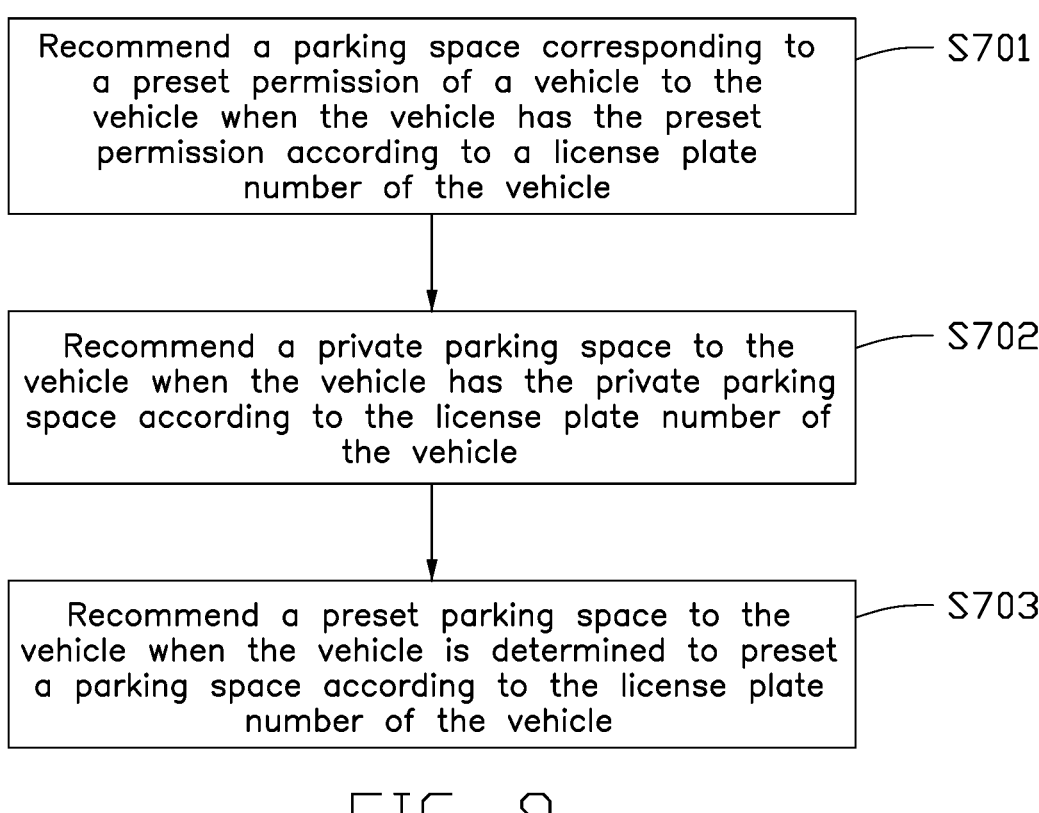
FIG. 9 is a flowchart of an embodiment showing how the system works when a vehicle is determined to be a member vehicle in a method for recommending parking.

In some embodiments, referring to FIG. 9, when the vehicle is determined to be the member vehicle of the member of the mall according to the license plate number of the vehicle, the method further includes:

S701: recommending the parking space corresponding to a preset permission of the vehicle to the vehicle when the vehicle has the preset permission according to the license plate number of the vehicle.

The preset permission can be a VIP (very important person) permission. When the method determines that the member driving the vehicle 1 has the VIP permission according to the member information of the mall corresponding to the license plate number of the vehicle, and determines that the vehicle 1 has the VIP permission. Namely, the vehicle 1 can park into a VIP parking space of the mall. Thus, the control module recommends the VIP parking space to the vehicle 1.

In some embodiments, as shown in FIG. 9, when the vehicle is determined to be the member vehicle of the member of the mall according to the license plate number of the vehicle, the method further includes:

S702: recommending a private parking space to the vehicle when the vehicle has the private parking space according to the license plate number of the vehicle.

It can be understood that, the member may not be the VIP, but the member can include his/her own parking space. When the control module determines that the vehicle 1 has a private parking space according to the member information corresponding to the license plate number of the vehicle, and recommends the private parking space to the vehicle 1.

In some embodiments, as shown in FIG. 9, when the vehicle is determined to be the member vehicle of the member of the mall according to the license plate number of the vehicle, the method further includes:

S703: recommending a preset parking space to the vehicle when the vehicle is determined to preset a parking space according to the license plate number of the vehicle.

The member of the mall can further preset the parking space. After the member presets the parking space, the method can generate a corresponding member information of the mall. Thus, the control module recommends the preset parking space to the vehicle 1 when the control module determines that the vehicle 1 presets the parking space according to the member information of the mall corresponding to the license plate number of the vehicle.

Figure 10:
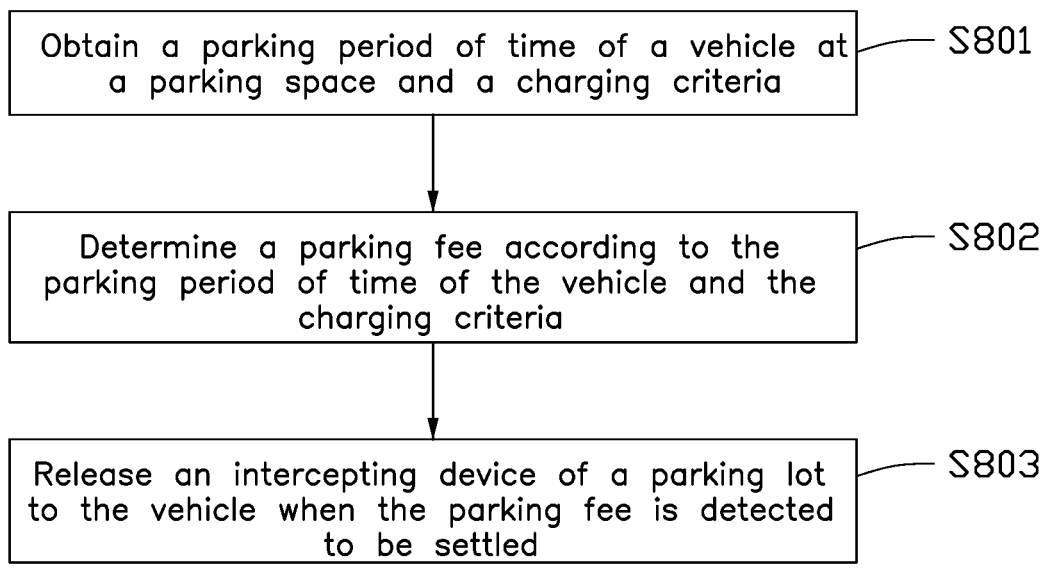
FIG. 10 is a flowchart of another embodiment of a method for recommending parking.

In some embodiments, referring to FIG. 10, the method further includes:

S801: obtaining a parking period of time of the vehicle at a target parking space and a charging criteria.

S802: determining a parking fee according to the parking period of time of the vehicle and the charging criteria.

S803: releasing an intercepting device of the parking lot to the vehicle when the parking fee is detected to be settled.

Figure 11:
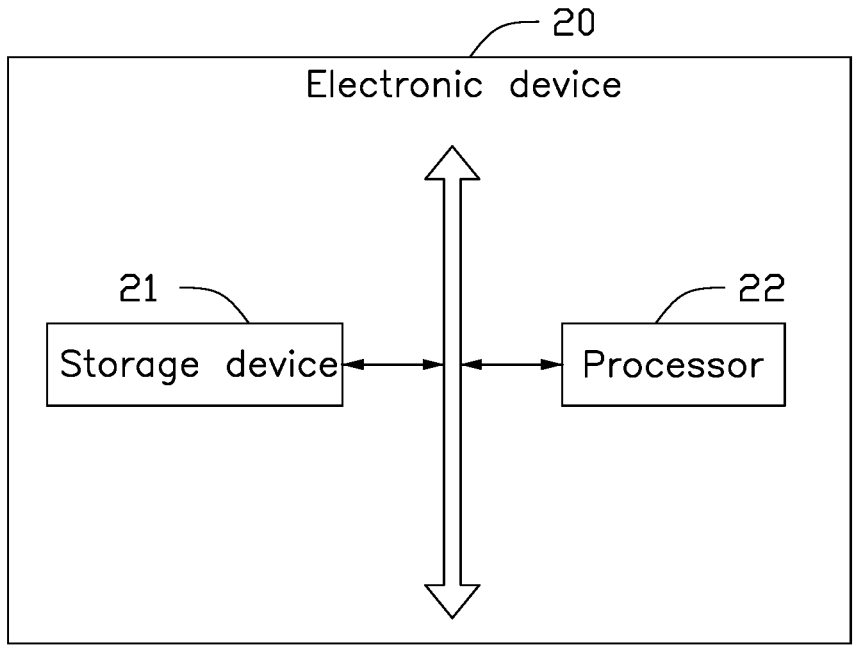
FIG. 11 is a schematic structural view of an embodiment of an electronic device.

Referring to FIG. 11, a block diagram of an electronic device is shown. The electronic device 20 can include a server, or the like. In one embodiment, the electronic device 20 includes a storage device 21 and at least one processor 22. Those skilled in the art should understand that the structure of the electronic device 20 shown in FIG. 7 does not constitute a limitation of the embodiment of the present disclosure. The electronic device 20 may also include more or less other hardware or software than shown, or have different component arrangements.

In some embodiments, the electronic device 20 includes a terminal that can automatically perform numerical calculation and/or information processing according to preset or stored instructions, and its hardware includes, but is not limited to, a microprocessor and an application specific integrated circuit, programmable gate arrays, digital processors and embedded devices, etc. In some embodiments, the storage device 21 may be used to store program codes and various data of computer programs. The storage device 21 may include Read-Only Memory (ROM), Random Access Memory (RAM), Programmable Read-Only Memory (PROM), and Erasable Programmable Read-Only Memory. EPROM), One-time Programmable Read-Only Memory (OTPROM), Electronically-Erasable Programmable Read-Only Memory (EEPROM), Compact Disc Read-Only Memory (CD-ROM) or other optical disk storage, disk storage, magnetic tape storage, or any other non-transitory computer-readable storage medium that can be used to carry or store data.

In some embodiments, the at least one processor 22 may be composed of an integrated circuit. For example, the at least one processor 22 can be composed of a single packaged integrated circuit or can be composed of multiple packaged integrated circuits with the same function or different function. The at least one processor 22 includes one or more microprocessors, one or more digital processing chips, one or more graphics processors, and various control chips. The at least one processor 22 is a control center of the electronic device, and performs various functions of the network device and/or processes data by running or executing a software program and/or module stored in the storage device 21 and invoking data stored in the storage device 21. When the foregoing integrated module is implemented in a form of a software functional module, the integrated module may be stored in a computer-readable storage medium. The software functional module is stored in a storage medium and includes several instructions for instructing a computer device (which may be a personal computer, a server, a network device, or the like) or a processor to perform some of the steps of the methods described in the embodiments of this application. The storage device 21 stores program code, and the at least one processor 22 is configured to invoke the program code stored in the storage device 21 to perform the relation function. In some embodiments, the storage device 21 stores a number of program codes. The program codes can be performed by the at least one processor 22 to perform a method for recommending parking. A detail of the at least one processor performing the program codes can refer to the related description of the steps of the method, which will not be described herein.

An embodiment of this application further provides a storage medium. The storage medium stores a computer program code. When the computer program code is run on an electronic device, the electronic device is enabled to perform the method for recommending parking.

A person of ordinary skill in the art may be aware that, in combination with the examples described in the embodiments disclosed in this specification, units and algorithm steps can be implemented by electronic hardware or a combination of computer software and electronic hardware. Whether the functions are performed by the hardware or the software depends on particular applications and design constraint conditions of the technical solutions. A person skilled in the art may use different methods to implement the described functions for each particular application, but it should not be considered that the implementation goes beyond the scope of this application. A person skilled in the art may clearly understand that, for the purpose of convenient and brief description, for a detailed working process of the system and apparatus described above, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms. The units described as separate parts may or may not be physically separate, and parts displayed as units may or may not be physical units, may be located in one location, or may be distributed on a plurality of network units. Some or all of the units may be selected based on an actual requirement to achieve the objectives of the solutions in the embodiments. In addition, functional units in the embodiments of this application may be integrated into one processing unit, or each of the units may exist alone physically, or two or more units are integrated into one unit. It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A method for recommending parking comprising:
obtaining vehicle information of a vehicle, using a processor that identifies and processes an image captured by a camera; where the vehicle information of the vehicle is provided with a price of the vehicle and a license plate number of the vehicle, which are stored in a storage device;
determining whether a member of a mall corresponding to the vehicle has a consumption record of the mall using the processor that accesses the storage device, when the vehicle is determined by the processor to be a member vehicle of the member of the mall according to the license plate number of the vehicle;

determining one or more historical consumption areas according to the consumption record of the mall if the member of the mall corresponding to the vehicle has the consumption record of the mall determined by the processor, and determining a target parking space of the vehicle from a plurality of parking spaces of the mall according to the one or more historical consumption areas; wherein the one or more historical consumption areas is one or more floor with a historical consumption in the mall;
determining one or more target shops of the mall using the processor that accesses the storage device to search an average price of the consumption in a shop being matched with the price of the vehicle if the member of the mall corresponding to the vehicle has no consumption record of the mall determined by the processor, and determining the target parking space of the vehicle according to an area where the one or more target shops of the mall are located;
recommending the target parking space to the vehicle on a display device of the vehicle;
generating a first parking path according to a first current position of the vehicle and the target parking space; and
transmitting the first parking path to the vehicle;
transmitting a first prompt information comprising a forward direction to the vehicle in response that the vehicle is located at an intersection of the first parking path;
controlling the target parking space to display a second prompt information and/or to release a parking lock of the target parking space in response that the vehicle is at the first parking path and is within a preset range of the target parking space detected by an ultrasonic parking space probe;
transmitting a third prompt information to the vehicle in response that the vehicle is not at any position of the first parking path; and
generating a second parking path according to a second current position of the vehicle and the target parking space, and transmitting the second parking path to the vehicle.

2. The method according to claim 1, further comprising:
determining a first score of each of the parking spaces according to a difference value between a size of the vehicle in the vehicle information and a size of a corresponding parking space, wherein the first score and the difference value are computed in the processor; where a change trend of the difference values is a negative correlation with a change trend of the first score.

3. The method according to claim 2, wherein determining the target parking space of the vehicle according to the one or more historical consumption areas further comprises:
determining a second score of each of the parking spaces according to one or more consumption rates corresponding to the one or more historical consumption areas, wherein the second score and the consumption rates are computed in the processor; where a change trend of the one or more consumption rates is a positive correlation with a change trend of the second score;
adding the first score of each of the parking spaces to the second score of each of the parking spaces to determine a plurality of first final scores of the parking spaces, which is computed in the processor; each of the parking spaces corresponding to one of the first final scores; and
determining the target parking space according to the first final scores, where the target parking space is one of the parking spaces of the mall whose first final score is highest in all of the first final scores.

4. The method according to claim 2, wherein determining the target parking space of the vehicle according to the area where the one or more target shops of the mall is located further comprises:

determining a third score of each of the parking spaces according to a distance between a corresponding parking space and the one or more target shops of the mall, wherein the third score and the distance are computed in the processor; where a change trend of the distance is a positive correlation with a change trend of the third score;

adding the first score of each of the parking spaces to the third score of each of the parking spaces to determine a plurality of second final scores of the parking spaces, which is computed in the processor; each of the parking spaces corresponding to one of the second final scores; and determining the target parking space according to the second final scores, where the target parking space is one of the parking spaces of the mall whose second final score is highest in all of the second final scores.

5. The method according to claim 1, wherein when the vehicle is determined to be the member vehicle of the member of the mall according to the license plate number of the vehicle, the method further comprises recommending one of the parking spaces corresponding to a preset permission of the vehicle to the vehicle when the vehicle is determined to comprise the preset permission according to the license plate number of the vehicle;

recommending a private parking space of the parking spaces to the vehicle when the vehicle is determined to comprise the private parking space according to the license plate number of the vehicle; and recommending a preset parking space of the parking spaces to the vehicle when the vehicle is determined to preset one of the parking spaces according to the license plate number of the vehicle.

6. An electronic device comprising:

a storage device;

at least one processor; and the storage device storing one or more programs, which when executed by the at least one processor, cause the at least one processor to:

obtain vehicle information of a vehicle, by identifying and processing an image captured by a camera; where the vehicle information of the vehicle is provided with a price of the vehicle and a license plate number of the vehicle, which are stored in a storage device;

determine whether a member of a mall corresponding to the vehicle has a consumption record of the mall by accessing the storage device, when the vehicle is determined to be a member vehicle of the member of the mall according to the license plate number of the vehicle;

determine one or more historical consumption areas according to the consumption record of the mall if the member of the mall corresponding to the vehicle has the consumption record of the mall, and determine a target parking space of the vehicle from a plurality of parking spaces of the mall according to the one or more historical consumption areas;

determine one or more target shops of the mall by accessing the storage device to search an average price of the consumption in a shop being matched with the price of the vehicle if the member of the mall corresponding to the vehicle has no consumption record of the mall, and determine the target parking space of the vehicle according to an area where the one or more target shops of the mall are located;

recommend the target parking space to the vehicle on a display device of the vehicle;

generate a first parking path according to a first current position of the vehicle and the target parking space; and transmit the first parking path to the vehicle;

transmit a first prompt information comprising a forward direction to the vehicle in response that the vehicle is located at an intersection of the first parking path;

control the target parking space to display a second prompt information and/or to release a parking lock of the target parking space in response that the vehicle is at the first parking path and is within a preset range of the target parking space detected by an ultrasonic parking space probe;

transmit a third prompt information to the vehicle in response that the vehicle is not at any position of the first parking path; and generate a second parking path according to a second current position of the vehicle and the target parking space, and transmit the second parking path to the vehicle.

7. The electronic device according to claim 6, further causing the at least one processor to:

determine a first score of each of the parking spaces according to a difference value between a size of the vehicle in the vehicle information and a size of a corresponding parking space, wherein the first score and the difference value are computed in the processor; where a change trend of the difference values is a negative correlation with a change trend of the first score.

8. The electronic device according to claim 7, further causing the at least one processor to:

determine a second score of each of the parking spaces according to one or more consumption rates corresponding to the one or more historical consumption areas, wherein the second score and the consumption rates are computed in the processor; where a change trend of the one or more consumption rates is a positive correlation with a change trend of the second score;

add the first score of each of the parking spaces to the second score of each of the parking spaces to determine a plurality of first final scores of the parking spaces, which is computed in the processor; each of the parking spaces corresponding to one of the first final scores; and determine the target parking space according to the first final scores, where the target parking space is one of the parking spaces of the mall whose first final score is highest in all of the first final scores.

9. The electronic device according to claim 7, further causing the at least one processor to:

determine a third score of each of the parking spaces according to a distance between a corresponding parking space and the one or more target shops of the mall, wherein the third score and the distance are computed in the processor; where a change trend of the distance is a positive correlation with a change trend of the third score;

add the first score of each of the parking spaces to the third score of each of the parking spaces to determine a plurality of second final scores of the parking spaces, which is computed in the processor; each of the parking spaces corresponding to one of the second final scores; and determine the target parking space according to the second final scores, where the target parking space is one of the parking spaces of the mall whose second final score is highest in all of the second final scores.

10. The electronic device according to claim 6, where when the vehicle is determined to be the member vehicle of the member of the mall according to the license plate number of the vehicle, further causes the at least one processor to:

recommend one of the parking spaces corresponding to a preset permission of the vehicle to the vehicle when the vehicle is determined to comprise the preset permission according to the license plate number of the vehicle;

recommend a private parking space of the parking spaces to the vehicle when the vehicle is determined to comprise the private parking space according to the license plate number of the vehicle; and recommend a preset parking space of the parking spaces to the vehicle when the vehicle is determined to preset one of the parking spaces according to the license plate number of the vehicle.

11. A non-transitory storage medium storing a set of commands, when the commands being executed by at least one processor of an electronic device, causing the at least one processor to:

obtain vehicle information of a vehicle, by identifying and processing an image captured by a camera; where the vehicle information of the vehicle is provided with a price of the vehicle and a license plate number of the vehicle, which are stored in a storage device;

determine whether a member of a mall corresponding to the vehicle has a consumption record of the mall by accessing the storage device, when the vehicle is determined to be a member vehicle of the member of the mall according to the license plate number of the vehicle;

determine one or more historical consumption areas by accessing the storage device to search an average price of the consumption in a shop being matched with the consumption record of the mall if the member of the mall corresponding to the vehicle has the consumption record of the mall, and determine a target parking space of the vehicle from a plurality of parking spaces of the mall according to the one or more historical consumption areas;

determine one or more target shops of the mall according to the price of the vehicle if the member of the mall corresponding to the vehicle has no consumption record of the mall, and determining the target parking space of the vehicle according to an area where the one or more target shops of the mall are located;

recommend the target parking space to the vehicle on a display device of the vehicle;

generate a first parking path according to a first current position of the vehicle and the target parking space; and transmit the first parking path to the vehicle;

transmit a first prompt information comprising a forward direction to the vehicle in response that the vehicle is located at an intersection of the first parking path;

control the target parking space to display a second prompt information and/or to release a parking lock of the target parking space in response that the vehicle is at the first parking path and is within a preset range of the target parking space detected by an ultrasonic parking space probe;

transmit a third prompt information to the vehicle in response that the vehicle is not at any position of the first parking path; and generate a second parking path according to a second current position of the vehicle and the target parking space, and transmit the second parking path to the vehicle.

12. The non-transitory storage medium according to claim 11, further causing the at least one processor to:

determine a first score of each of the parking spaces according to a difference value between a size of the vehicle in the vehicle information and a size of a corresponding parking space, wherein the first score and the difference value are computed in the processor; where a change trend of the difference values is a negative correlation with a change trend of the first score.

13. The non-transitory storage medium according to claim 12, further causing the at least one processor to:

determine a second score of each of the parking spaces according to one or more consumption rates corresponding to the one or more historical consumption areas, wherein the second score and the one or more consumption rates are computed in the processor; where a change trend of the one or more consumption rates is a positive correlation with a change trend of the second score;

add the first score of each of the parking spaces to the second score of each of the parking spaces to determine a plurality of first final scores of the parking spaces, which is computed in the processor; each of the parking spaces corresponding to one of the first final scores; and determine the target parking space according to the first final scores, where the target parking space is one of the parking spaces of the mall whose first final score is highest in all of the first final scores.

14. The non-transitory storage medium according to claim 12, further causing the at least one processor to:

determine a third score of each of the parking spaces according to a distance between a corresponding parking space and the one or more target shops of the mall, wherein the third score and the distance are computed in the processor; where a change trend of the distance and the third score is a positive correlation with a change trend of the third score;

add the first score of each of the parking spaces to the third score of each of the parking spaces to determine a plurality of second final scores of the parking spaces, which is computed in the processor, each of the parking spaces corresponding to one of the second final scores; and determine the target parking space according to the second final scores, where the target parking space is one of the parking spaces of the mall whose second final score is highest in all of the second final scores.

* * * * *